United States Patent [19]

Gratzer

[11] Patent Number: 4,575,030
[45] Date of Patent: Mar. 11, 1986

[54] LAMINAR FLOW CONTROL AIRFOIL

[75] Inventor: Louis B. Gratzer, Seattle, Wash.

[73] Assignee: The Boeing Company, Seattle, Wash.

[21] Appl. No.: 416,923

[22] Filed: Sep. 13, 1982

[51] Int. Cl.$^4$ .............................................. B64C 21/06
[52] U.S. Cl. .................................... 244/209; 244/212; 244/214
[58] Field of Search ............................... 244/207–212, 244/214, 215, 216, 35 R

[56] References Cited

U.S. PATENT DOCUMENTS

| | | |
|---|---|---|
| 2,270,920 | 1/1942 | Backhaus . |
| 2,423,803 | 7/1947 | Stalker ................................. 244/209 |
| 2,517,524 | 8/1950 | Beck et al. ........................... 244/209 |
| 2,580,339 | 12/1951 | Woodward, Jr. . |
| 2,585,676 | 2/1952 | Poisson-Quinton . |
| 2,659,552 | 11/1953 | Stalker . |
| 2,742,247 | 4/1956 | Lachmann . |
| 2,751,168 | 6/1956 | Stalker . |
| 2,833,492 | 5/1958 | Fowler . |
| 2,876,966 | 3/1959 | Cook . |
| 2,925,231 | 2/1960 | Pfaff, Jr. et al. . |
| 2,945,644 | 7/1960 | Colman . |
| 2,988,302 | 6/1961 | Smith . |
| 3,054,579 | 9/1962 | Bary . |
| 3,055,614 | 9/1962 | Thompson . |
| 3,093,350 | 6/1963 | Wilkins . |
| 3,117,751 | 1/1964 | Rogers et al. . |
| 3,128,973 | 4/1964 | Dannenberg . |
| 3,435,654 | 4/1969 | Papst . |
| 3,917,193 | 11/1975 | Runnels, Jr. ........................ 244/210 |
| 3,941,334 | 3/1976 | Cole ..................................... 244/215 |
| 3,951,360 | 4/1976 | Anxionnaz . |
| 4,120,470 | 10/1978 | Whitener ............................. 244/215 |

FOREIGN PATENT DOCUMENTS 2064709  6/1981  United Kingdom ................ 244/209

OTHER PUBLICATIONS

NASA Facts, "Laminar Flow Control Technology", NF-86/8–79, 1979.

Primary Examiner—Galen L. Barefoot
Attorney, Agent, or Firm—Christensen, O'Connor, Johnson & Kindness

[57] ABSTRACT

A laminar flow control aircraft wing combines suction surfaces and slots in its leading and trailing edge regions, with natural laminar flow over its main box region to achieve laminar boundary layer flow over a majority of the wing surface area. The wing includes a leading edge flap that is used to protect the leading edge region of the wing from insect accumulation and surface erosion caused by the impact of dirt, rain, or other airborne materials when the leading edge flap is deployed in a low-speed position. At high aircraft speeds, the leading edge flap is stored in the surface of the leading edge region of the wing and forms part of the suction system for that area of the wing. The wing also includes a flexible trailing edge suction surface spoiler system that allows the spoilers to bend downwardly when the trailing edge flap is deployed into a low-speed position.

5 Claims, 18 Drawing Figures

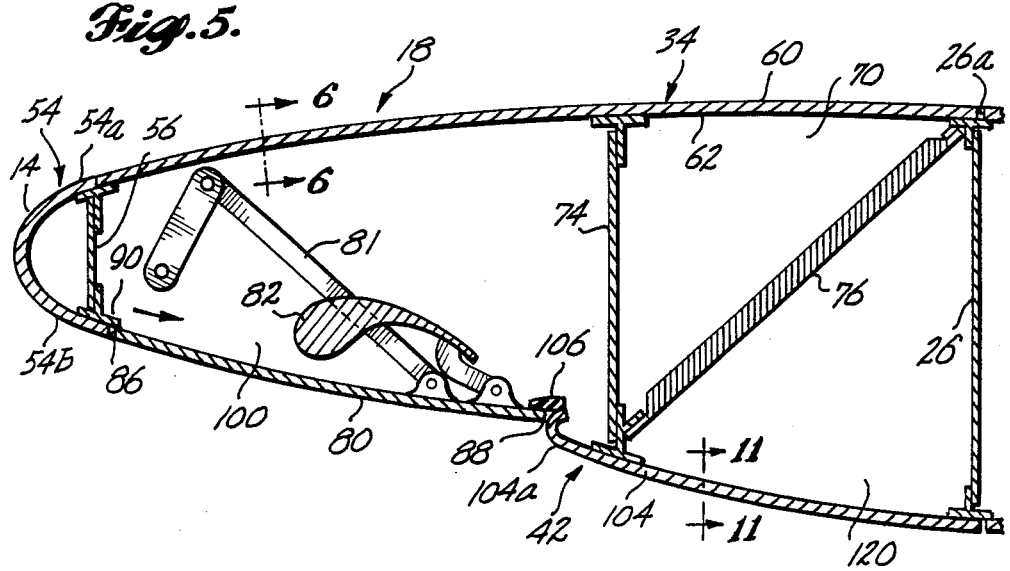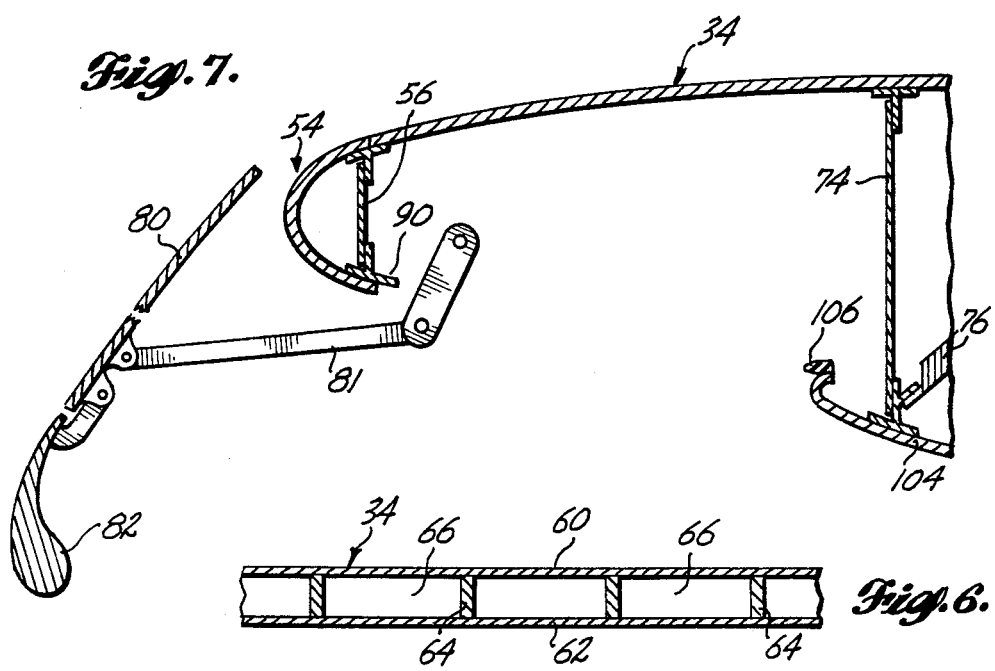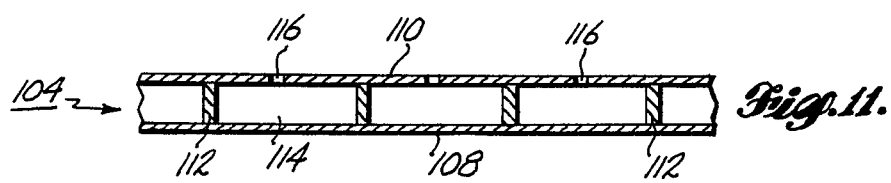

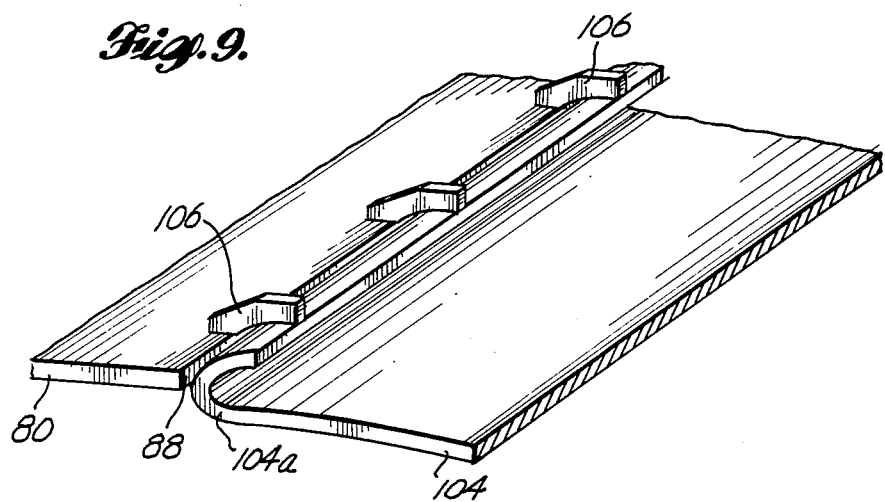
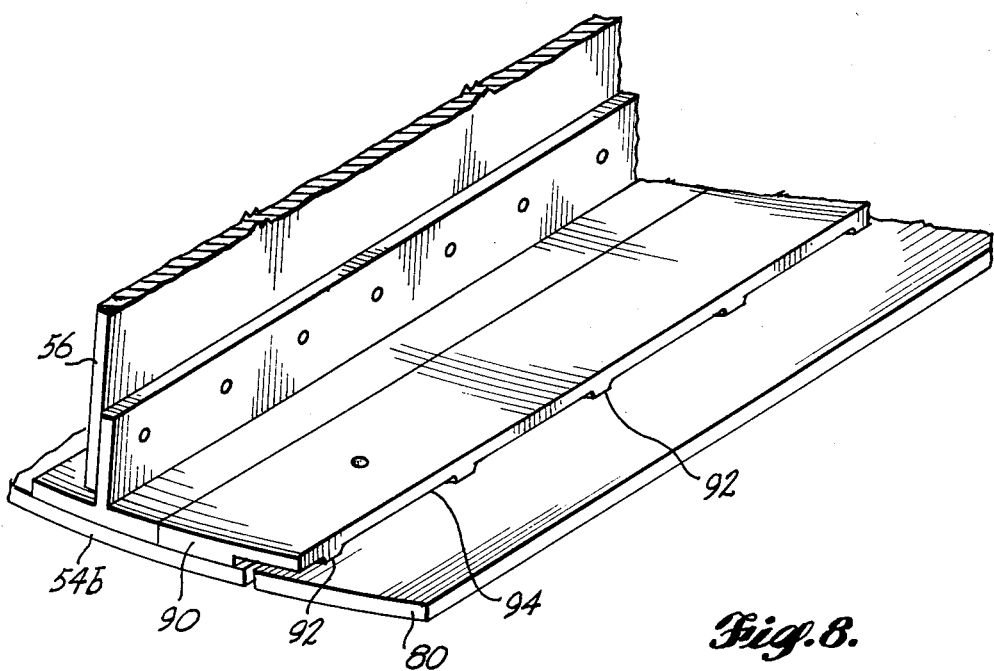

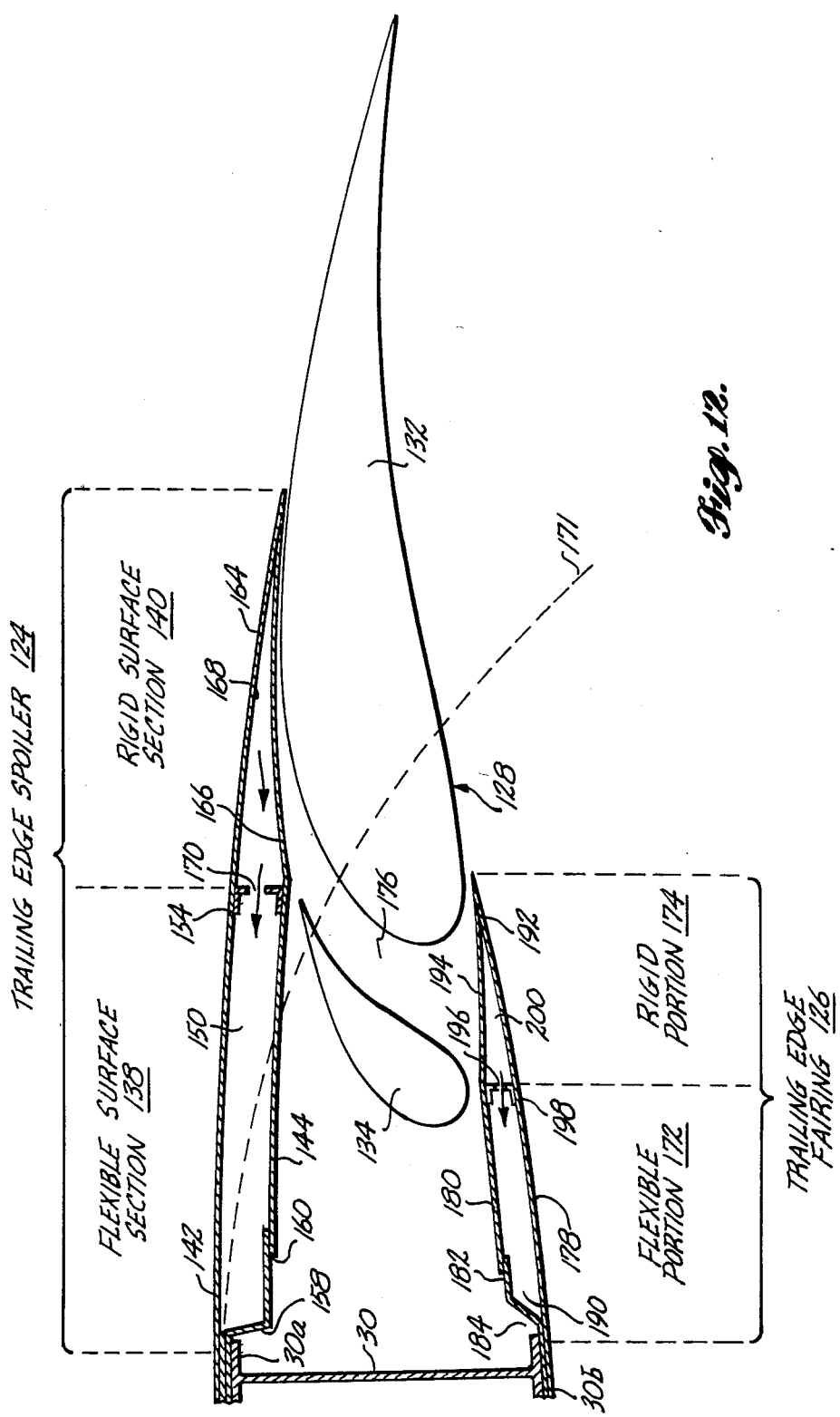

LAMINAR FLOW CONTROL AIRFOIL

BACKGROUND

This invention relates to airfoils, and more particularly to a laminar flow control swept wing for use on jet transports.

There have been continuing efforts over the years to reduce the aerodynamic drag of aircraft and their components in order to increase cruise efficiency. It is known by those skilled in the art that if the boundary layer airflow over an airfoil can be maintained laminar, skin friction drag is minimized.

Use of suction applied to aerodynamic surfaces to maintain laminar flow at high Reynolds numbers and during flight conditions beyond those where laminar flow can be expected to occur naturally, is also well known to those skilled in the art. There have been many proposals to accomplish this using various slot arrays, perforated or porous skin and associated suction ducting.

However, there are generally disadvantages associated with suction systems as previously proposed, such as undue added structural weight, complexity, and increased construction and maintenance costs. Additionally, since the use of suction on aerodynamic surfaces involves the addition of new systems, parts, substructures and structures that must integrated with the principal airflow systems and structures, the task of establishing functional reliability of new and unproven arrangements required by prior proposals has been a major concern and deterrent.

Also, variability of the operating environment of the aircraft can impose conditions which are generally inhospitable to the maintenance of laminar flow over aerodynamic surfaces. The distribution and magnitude of applied suction is based on certain assumptions as to operating environment, and when conditions vary widely as they do at times in flight due to air turbulence, noise, etc., those design assumptions no longer fit. The present invention, as one of its objectives, seeks to minimize drag penalty experienced when air conditions vary beyond assumed values.

Prior laminar flow control systems were predicted essentially on gross compromises of conventional wing construction and configuration so as to accommodate slots, pores, ducts, etc. The added cost, weight and complexities, along with the difficulties of access to inspect and maintain the added subsystems, tended to offset the gains sought through laminar flow control even under assumed (ideal) flight conditions.

An object of this invention is to provide a laminar flow control airfoil which minimizes the aforementioned limitations and disadvantages of prior system proposals and which can be incorporated in conventional proven wing structures with minimum interface problems and with essentially no disruption or interference with the design integrity and established reliability of the existing airfoil main structure and its systems.

It is another object of this invention to provide an airfoil structural arrangement that has a built-in capability to maintain surface smoothness in the critical nose area against dents, erosion, and accumulations of insects and dirt particles. These factors cause disturbances which inhibit or destroy laminar flow but which can be controlled by the proper use of leading edge suction.

SUMMARY OF THE INVENTION

The foregoing and other objects are achieved in accordance with this invention by providing an airfoil that maintains laminar boundary layer flow over most of the airfoil surface by providing surface suction distributed over the minor airfoil surface area represented by the leading and trailing edge sections and by combining this with natural laminar flow achieved by contour alone over the intervening main box region section of the airfoil, representing the major surface area of the airfoil.

In accordance with this invention, an improved low-drag airfoil (typically the main wing) is provided based on a hybrid design concept utilizing laminar flow control (LFC) by suction of the boundary layer over minor areas of the airfoil and natural laminar flow (NLF) control over the major area of the airfoil. Applied as herein to a main wing, the wing box with surfaces making up the major area of the wing is conventionally structured with the intended advantages of proven structural integrity, light weight and minimum cost to serve as the basic wing load carrier, and also of proven leak proof wall integrity to serve safely as the primary fuel container, a container structure incidentally also designed for maximized volumetric fuel capacity. Natural laminar flow over top and bottom surfaces of this main wing section is achieved by way of surface contouring achieving favorable pressure gradients conducive to laminar flow over the normal climb and cruise speed range of the aircraft. The leading edge section is contoured to provide the pressure distribution, generally involving highly favorable pressure gradients at the nose, which will minimize the suction air requirement and also result in a leading edge radius that suppresses the tendency for transition to turbulent flow at the attachment line (i.e. the forward-most edge of the airfoil). Complementary contouring of the remaining minor surface areas of the wing, including those of the trailing edge section, is based on factors which yield a structurally and aerodynamically efficient composite airfoil in other respects. Laminar flow control over those surface areas is achieved to the extent possible by the provision of a suction system, applying suction through skin pores over the smooth surface areas and through slot arrays next to joints and discontinuities requiring greater (localized) applications of suction.

In the preferred embodiment of the invention applied to a main wing, leading and trailing edge sections include parts employing a double skin panel construction. A porous or slotted outer skin separated from a nonporous inner skin by spacers forms a collector chamber. Boundary layer air drawn through the outer skin passes through vents or holes in the collector chamber into a subsurface duct which is part of an air collection system in the airfoil. When the leading edge flap is retracted, it forms part of the leading edge region lower surface. Suction slots formed in an array extending along the front and rear edges of the leading edge flap bleed off boundary layer air to compensate for the abrupt surface discontinuities represented by such edges, in order to maintain laminar flow.

The practical advantages realized through implementation of laminar flow control focused on the leading edge section, and preferably also the trailing edge section, include both construction cost reductions and operating cost reductions. Inasmuch as the skin structure of the wing box need not be penetrated by holes or slots, the entire main wing box can be of proven conventional design, both externally and internally. Without the necessity of incorporating laminar flow control suction ducting within the main wing box, there is no significant interface required between the fuel tank regions within the box and the LFC suction system, risking fuel leakage into that system. Furthermore, LFC auxiliary structures that are added to the composite wing incur minimum weight penalty since they are confined to relatively small, noncritical areas of the wing. For similar reasons, manufacturing cost additions attributed to these auxiliary features are minimized, and the components which are correspondingly small in size can be manufactured separately and conveniently installed separately or as subassemblies. Likewise, inspection, maintenance, and repair is readily manageable because of the ease of access due to their location in the wing edge portions and due also to the extendability of the flaps and spoilers involved.

As an additional feature, the invention employs, in association with LFC direct provisions, a wholly retractable and extendable leading edge flap whose primary purpose is to extend the lift capability of the wing. However, it is also a deflector which, deployed during takeoffs and landings, protects the leading edge of the wing from impact by insects, dirt and other particles. The accumulation of these, including occasional erosion and denting, can significantly increase drag by causing loss of laminar flow in the affected areas and can also plug the LFC suction pores in the critical nose surface area of the wing.

The trailing edge portion of the wing includes a fully extendable and retractable flap whose primary function in normal climb and cruise flight is to provide lateral control. Small flap deflections are used to make adjustments in the wing pressure distribution that are necessary to maintain laminar flow throughout the normal flight envelope. Upper surface (i.e. spoiler) panels, each containing a flexible element and independently actuated, are programmed to follow the flap motion so as to maintain the optimum contour. For low speed flight, large flap deflections further increase the wing lift capability. As before, the lateral control function is provided by the flaps through independent signals to the flap actuators and the upper surface panels follow the flap continuously to maintain optimum airfoil contours. The upper surface panels are also independently controlled to provide the usual spoiler function for flight and ground operations.

Lower surface panels disposed spanwise and each containing a flexible element serve as fairings to enhance the effectiveness of the flaps at large deflection angles. Both upper and lower surface panels contain suction surfaces and systems to provide laminar flow in the trailing edge areas within the normal flight envelope.

BRIEF DESCRIPTION OF THE DRAWINGS

Other objects and advantages of the present invention will become apparent to one skilled in the art after a reading of the following description taken together with the accompanying drawings, in which:

FIG. 5 shows an enlarged cross-sectional view of the leading edge region of the wing taken along section line 5—5 of FIG. 1;

FIG. 6 is an enlarged cross-sectional view of the leading edge region upper surface taken along section line 6—6 of FIG. 5;

FIG. 7 is an enlarged partial cross-sectional view of the leading edge region of the wing with the leading edge flap in the low speed position.

FIG. 8 is an enlarged perspective view of the inner surface of the leading edge region of the wing wherein the front edge of the leading edge flap comes up against a front stop plate;

FIG. 9 is an enlarged perspective view of the inner surface of the leading edge region of the wing wherein the rear edge of the leading edge flap comes up against the flap stops;

FIG. 11 is an enlarged cross-sectional view of the leading edge region lower surface taken along section line 11—11 of FIG. 5;

FIG. 12 is an enlarged cross-sectional view of the trailing edge region of the wing taken along section line 12—12 of FIG. 1;

DETAILED DESCRIPTION

Figure 1:
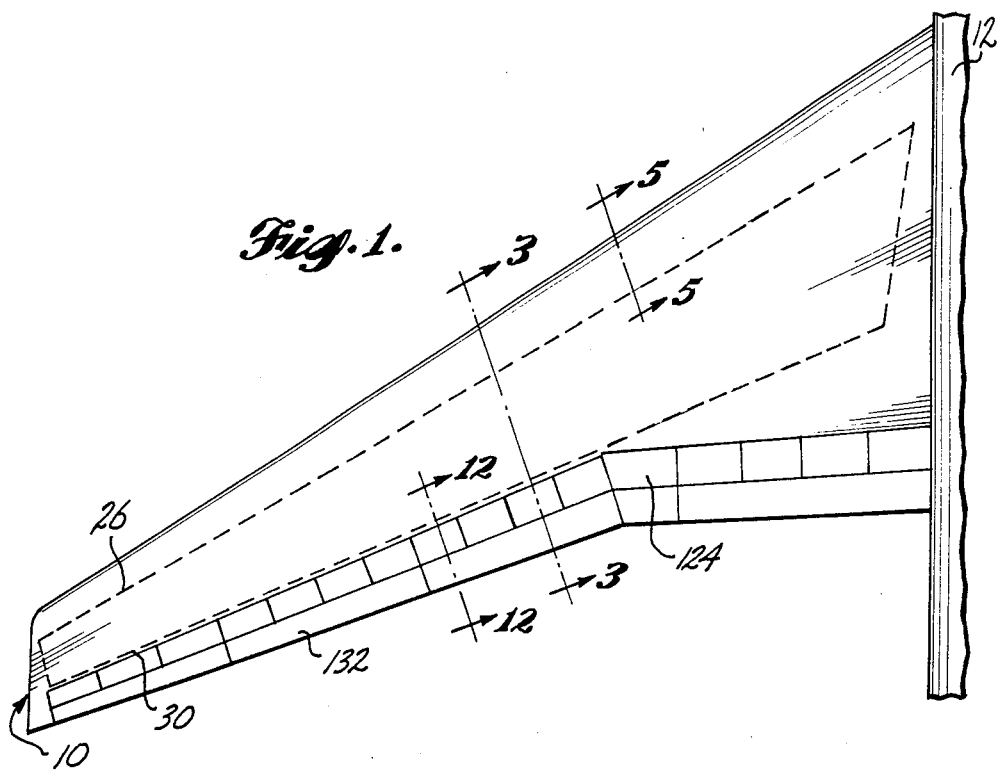
FIG. 1 is a plan view of the upper surface of a wing attached to the fuselage of an aircraft.
Figure 2:
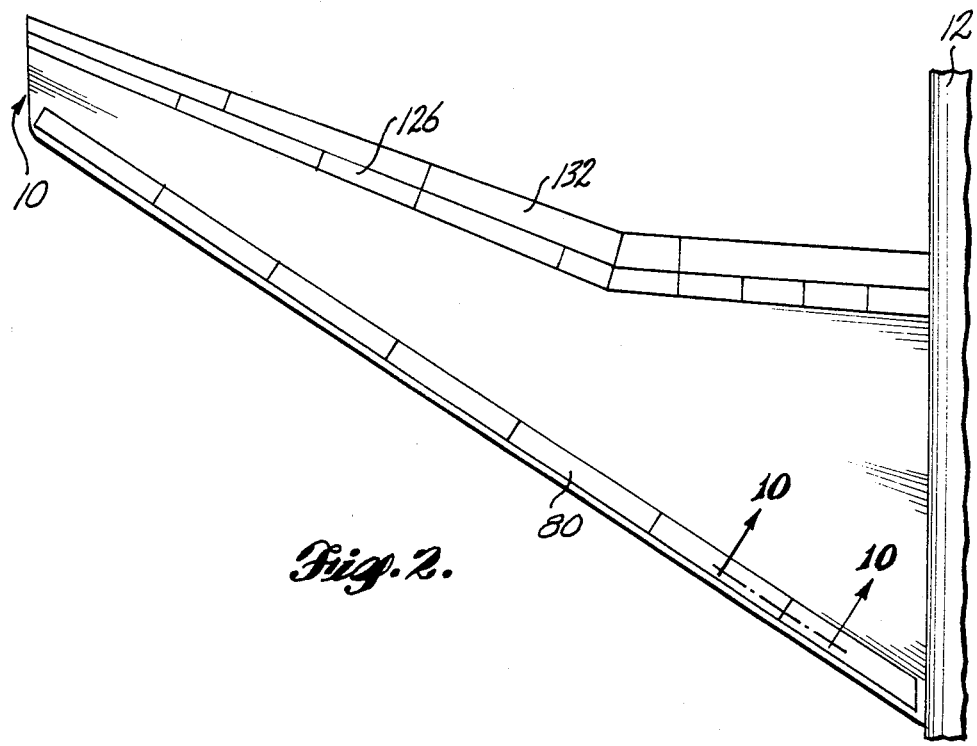
FIG. 2 is a plan view of the lower surface of an aircraft wing.
Figure 3:
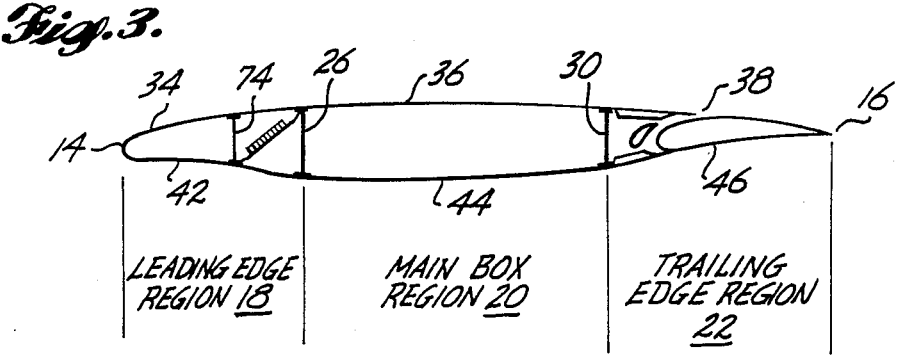
FIG. 3 is a cross-sectional view of an aircraft wing taken along section line 3—3 of FIG. 1.

In FIGS. 1 and 2, wing 10, attached to a fuselage 12, is divided into three sections or regions: (1) leading edge region 18, (2) main box region 20, and (3) trailing edge region 22 as shown in FIG. 3. Region 18 extends chordwise between the leading edge or nose 14 and a front main box spar 26 forming part of the main box region 20. The trailing edge region 22 extends aft from rear main box spar 30 to the trailing edge 16. In accordance with the present novel hybrid wing concept, flow over leading edge region 18 and trailing edge region 22 is kept laminar with the aid of suction applied through their surfaces while flow over the surfaces of the main box region 20 is kept laminar naturally by designing the surface contours of those surfaces to promote the required favorable pressure gradients.

Figure 4:
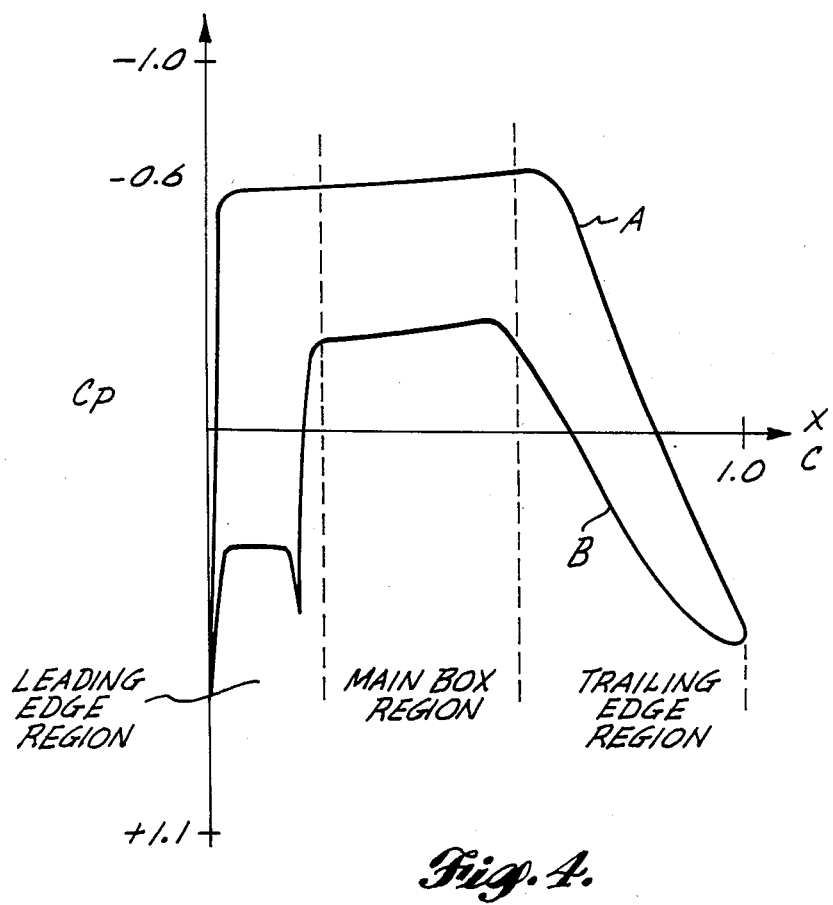
FIG. 4 is a graph illustrating the relationship of the coefficient of pressure ($C_P$) with location on the wing surface.

In FIG. 4, showing the characteristics of the preferred pressure distribution, coefficient of pressure ($C_p$) of the hybrid wing is plotted at cruise speed as a function of displacement from the nose or leading edge 14. $C_p$ is defined by the following equation:

$$C_p = \frac{p - p_{oo}}{q},$$

where p equals the local pressure at a given point x; $p_{oo}$ equals atmospheric pressure; and q equals $\rho$ times $V^2/2$, where $\rho$ equals air density, and V equals free stream velocity. Curve A in FIG. 4 shows the variation of $C_p$ over the wing's upper surface and curve B represents the variation of $C_p$ over the wing's lower surface.

At cruise (e.g., mach number 0.8), the $C_p$ at the stagnation point on the leading edge 14 is approximately +1.1 From there the upper surface $C_p$ rapidly becomes negative as the air accelerates over the leading edge region upper surface 34. By proper contouring of the main box upper surface 36, the $C_p$ is held by upper surface contour to maintain the necessary favorable pressure gradient for laminar airflow over that upper surface. As such airflow leaves the main box region 20 and flows over the trailing edge region upper surface 38 to the trailing edge 16, the $C_p$ increases from a negative to a positive value until the airflow separates from the trailing edge 16 of the wing.

With respect to the lower wing surface, the $C_p$ increases initially from leading edge 14, but remains positive over the leading edge region lower surface 42 because of the relatively flat contour of that surface. $C_p$ then becomes negative as the air flows from the leading edge region lower surface 42 to the main box region lower surface 44. Here also, a favorable pressure gradient in the direction of airflow over the main box region lower surface 44 is maintained naturally because of the contour of the surface. In the transition area from the main box region lower surface 44 to the trailing edge region lower surface 46, the $C_p$ for the lower surface starts to increase until the trailing edge 16 is reached, at which point the air flowing over the lower surface joins the air flowing over the wing's upper surface as it separates from the wing 10.

In FIG. 5 nosepiece 54 is configured in an approximate parabolic profile extending into an upper edge portion 54a and a lower edge portion 54b. Extending the length of wing 10, nosepiece 54 is preferably of integral titanium honeycomb core construction. Its rearward edges are joined to upright nose spar 56, also extending the spanwise length of the nosepiece.

Also joined to nose spar 56 and extending aft as a continuation of nosepiece upper surface 54a is a dual skin panel 34 including porous (multiply apertured) outer skin 60 and a nonporous inner skin 62 maintained parallel to skin 60 by chordwise-oriented parallel spacers 64 (FIG. 6.). The spaces 66 thus formed within panel 34 form suction air collection chambers and flow passages that conduct air drawn through the distributed pores or apertures in skin 60 rearward through the upper surface duct 70. Duct 70 is formed forwardly of and above the diagonally oriented partition 76 extending between the lower edge of an upright auxiliary spar 74, spaced forwardly from the front spar 26, and upper panel 34. In the space between auxiliary spar 74 and front spar 26, the inner skin 62 contains multiple holes (not shown) which are sized to meter the suction airflow into upper surface duct 70.

Still referring to FIG. 5, the leading edge region lower surface skin panel assembly 42 includes spanwise extending lines of suction slots 86 and 88 formed at the forward and rear edges of leading edge flap 80. Aft of slot line 88 this lower surface assembly 42 comprises a short bullnose section 104a contiguous with a hollow skin panel 104 having a porous or multiply aperatured outer skin and an inner skin. Leading edge flap 80 is mounted to be deployed and retracted by a suitable (whose details are or may be conventional) mechanism 81, typical of leading edge flap systems. When extended from retracted cruise setting (FIG. 5) into the deployed setting (FIG. 7), leading edge flap 80 increases lift for low speed operation in the usual way. Moreover, as a unique additional feature, the fully deployed leading edge flap 80 is positioned forwardly of nose 54 and oriented at a rearward incline. It thereby serves as a deflector that protects the leading edge wing surfaces from the accumulations of insects and dirt, and, to a substantial degree, from surface erosion due to dirt, rain, or hail. Such accumulations and erosion create surface discontinuities that interfere with the maintenance of laminar flow over the leading edge region of the wing 10. As shown in FIGS. 5 and 7, the leading edge flap comprises a main panel which forms part of the leading edge region lower surface and an auxiliary flap 82 hinged to it that is normally folded over to be received within the leading edge region interior with the leading edge flap retracted. When the leading edge flap 80 is deployed, auxiliary flap 82 is pivoted downwardly and forwardly and forms an aerodynamic leading edge to complete the contour of the resultant high-lift wing leading edge section.

Surface jogs or discontinuities created in the lower surface of the leading and trailing sections of leading edge flap 80 in the stored cruise position are initiating factors creating turbulence and flow separation. Suction applied adjacent to these discontinuities through the previously mentioned slots 86 and 88 are effective to maintain laminar flow at these locations. The suction applied through these slots also minimizes cross-flow instability along the leading edge or nose of the wing. It also minimizes the turbulence-inducing effect of any accumulations of insects and dirt, and of surface erosion that may have occurred.

Figure 15:
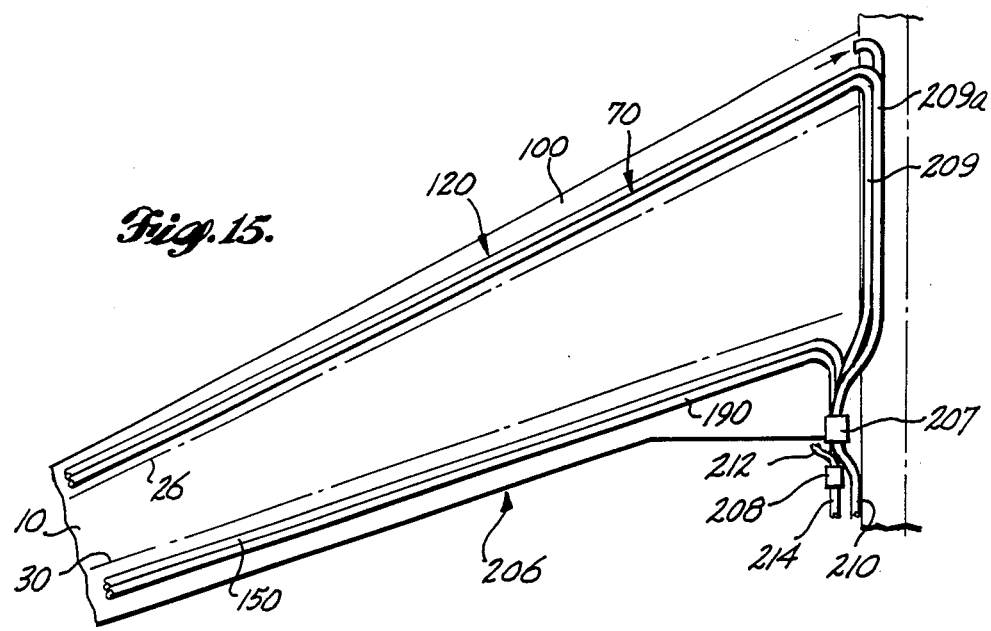
FIG. 15 is a cutaway plan view of an air collection system for an aircraft wing.

Slot 86 is formed by the gap or space in between the rear edge of the nosepiece lower portion 54b and the front edge of the leading edge flap 80. A substantially planar front stop plate 90 is mounted adjacent the rear edge of the nosepiece lower portion 54b and serves as a stop for the front edge of the leading edge flap 80 when the flap is retracted into cruise position. A series of downwardly oriented projections 92, spaced apart spanwise of the wing, extend from the lower surface of this front stop plate and serve as the actual stop abutments. As shown best in FIG. 8, projections 92, the lower surface of stop plate 90 and the inner surface of the leading edge flap 80 form entry passages 94 for suction airflow passing from the leading edge front slot 86 into purge duct 100. This duct is formed by the nose spar 56, skin panel 62, auxiliary spar 74, and the leading edge flap 80. Slot 88 also opens directly into purge duct 100. At cruise speeds, purge duct 100 under suction created by compressor 207 (FIG. 15), is maintained at a pressure lower than that outside the slots 86 and 88.

The forward edge 104a (FIG. 9) of the leading edge section outer skin 104 is turned inwardly and rearwardly to its terminus, so as to form a forwardly facing convex surface as one side of an orifice comprising the rear slot 88. Mounted on the upper side of the forward edge 104a are a series of forwardly extending flap stops 106 carried in positions spaced apart spanwise of the wing by the trailing edge of the leading edge flap 80. The leading edge flap 80 abuts upwardly against these flap stops when the flap is stowed in its cruise position. The flap actuator mechanism aided by differential air pressure acting upon the flap 80 cooperate to hold the flap firmly in its cruise position once it is retracted by such mechanism.

As previously mentioned, and as shown in FIGS. 3 and 5, leading edge flap 80 when stowed is essentially horizontal. Moreover, its exposed surface contour is fairly flat. Hence, the values of $C_p$ over most of its chordal length remain uniformly positive and thereby favorable to laminar flow. At its edges suction slots 86 and 88 are effective to eliminate flow disturbances and maintain laminar flow.

Figure 10:
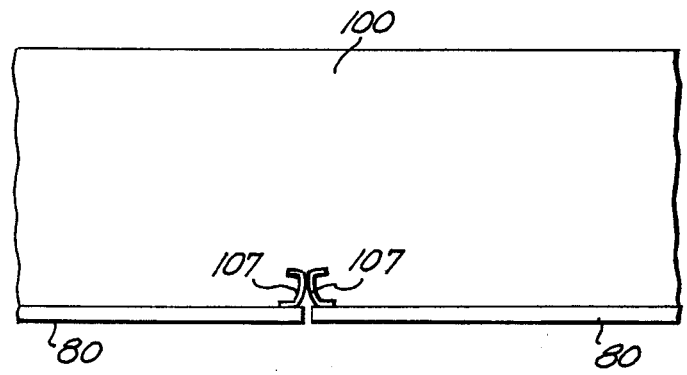
FIG. 10 is an enlarged cross-sectional view of a joint between two leading edge flap surfaces taken along section line 10—10 of FIG. 2.

Each wing carries a series of similar leading edge flaps 80 mounted end to end as shown. Channel shaped flexible metal seals 107 (FIG. 10) are fastened to the end edges of the flaps and cooperate to seal the joints between such ends sufficiently to prevent all but minor amounts of suction air to pass between them into purge duct 100.

Referring to FIGS. 5 and 11, the remaining panel 104 of the leading edge region lower surface 42 is formed by a porous outer skin 108 and a vented inner skin 110 maintained in spaced parallel relationship by intervening spacers 112. Suction air drawn through the pores or apertures in the outer skin 108 into the passage spaces 114 between these skins flows through vents 116 in the inner skin 110 and from there into the lower surface duct 120. These multiple holes or vents are approximately placed and sized to meter the suction airflow through the outer skin 108. The lower surface duct 120 is formed by the front spar 26, the partition 76 and the leading edge lower skin 104.

The main box region 20 is contoured to provide a pressure distribution as shown in FIG. 4 to induce laminar flow naturally, that is, without resort to surface pores or slots distributed over its surface area. It thereby avoids the complications and added weight attending use of subsurface structures and ducting going along with a porous or slotted suction surface approach to achieving laminar flow, especially when applied over the major wing section's surface area and to some extent, at least, unavoidably intruding upon what is preferably a proven conventional structural and fuel storage wing section. In order to achieve natural laminar flow over its chordal extent at top and bottom surfaces, the contours of these surfaces are only moderately convex. As shown in simplified general form in FIG. 3, the main box region top skin panel 36 spans between the top edges 26a and 30a of front and rear main box spars 26 and 30, while the main box region lower surface 44 similarly spans between the respective lower edges 26b and 30b of these spars. Details of the wing box structure omitted from the drawings may be conventional, but are not required to be so.

Referring to FIG. 12, the wing's trailing edge region 22 extending aft from main box region 20 comprises an upper surface spoiler 124, a lower surface trailing edge fairing 126, and an extendable trailing edge main flap 128. Suction surface panels are used selectively in the trailing edge region 22 in order to help maintain laminar airflow proceeding aft from the main box surfaces. Trailing edge flap composite 128, preferably conventional, includes a primary flap member 132 and a secondary flap member 134 mounted forwardly of member 132, in fixed relationship thereto, defining a slot 176 between them. Since the linkage and drive means for mounting and moving the flap composite 128 between deployed and stowed positions are or may be conventional, the drawings herein are simplified by omitting these details.

Trailing edge spoiler 124 comprises a forward flexible surface section 138 and a rigid section 140 continuing aft from it and having about the same chordal extent. The flexible section 138 is joined by its forward edge to the top edge 30a of the rear spar 30. Joined to section 138, rigid section 140 terminates aft thereof at a point approximately at the mid-chord position of the flap, where it closely overlies and fairs into the top side of flap 132 with the latter stowed in the cruise position. The lower surface contour of section 140 is relieved concavely so as to accommodate the convexed top side contour of flap 132 immediately underlying it with the flap stowed.

In the present embodiment, the flexible surface section 138 is configured of a porous, flexible outer skin 142, which serves as a suction surface, and a nonporous, substantially inflexible inner skin 144 that is approximately parallel to and spaced inwardly from the outer skin 142. The space between the outer and inner skins forms a spoiler suction air collection duct 150. The outer skin 142 is affixed by its forward edge to top edge 30a of the rear box spar 30 and extends rearwardly to a point adjacent an upper surface cross member 154. The forward edge of the inner skin 144 is mounted to lay on the lower side of a horizontal flange of a hanger bracket 158 by means of a sliding joint 160. The hanger bracket 158 is attached to the top edge 30a of the rear spar and extends downwardly and rearwardly to a point adjacent the forward edge of the inner skin. The sliding joint 160 allows the inner skin to move relative to bracket 158 as the spoiler 124 pivots with respect to the wing 10. Leakage of air past the sliding joint is minimized by the placement of the inner skin 144 below the flange of bracket 158. Since the air pressure inside of spoiler duct 150 is lower than the pressure outside, inner skin 144 is forced upwardly against the bracket 158.

The rigid section 140 of the trailing edge spoiler 124 consists of a porous upper skin 164 and a nonporous lower skin 166. The forward edge of the upper skin 164 is spaced away from the forward edge of the lower skin 166 by the upper surface cross member 154, and the rear edges of the upper and lower skins converge with one another at the rear edge of the spoiler 124. The space between the upper and lower skins 164 and 166 forms a rear spoiler suction air collection chamber 168. The upper surface cross member 154 has vent holes 170 that allow air to be drawn through the upper skin 164 into the rear spoiler chamber 168 and into the flexible spoiler duct 150.

Figure 13:
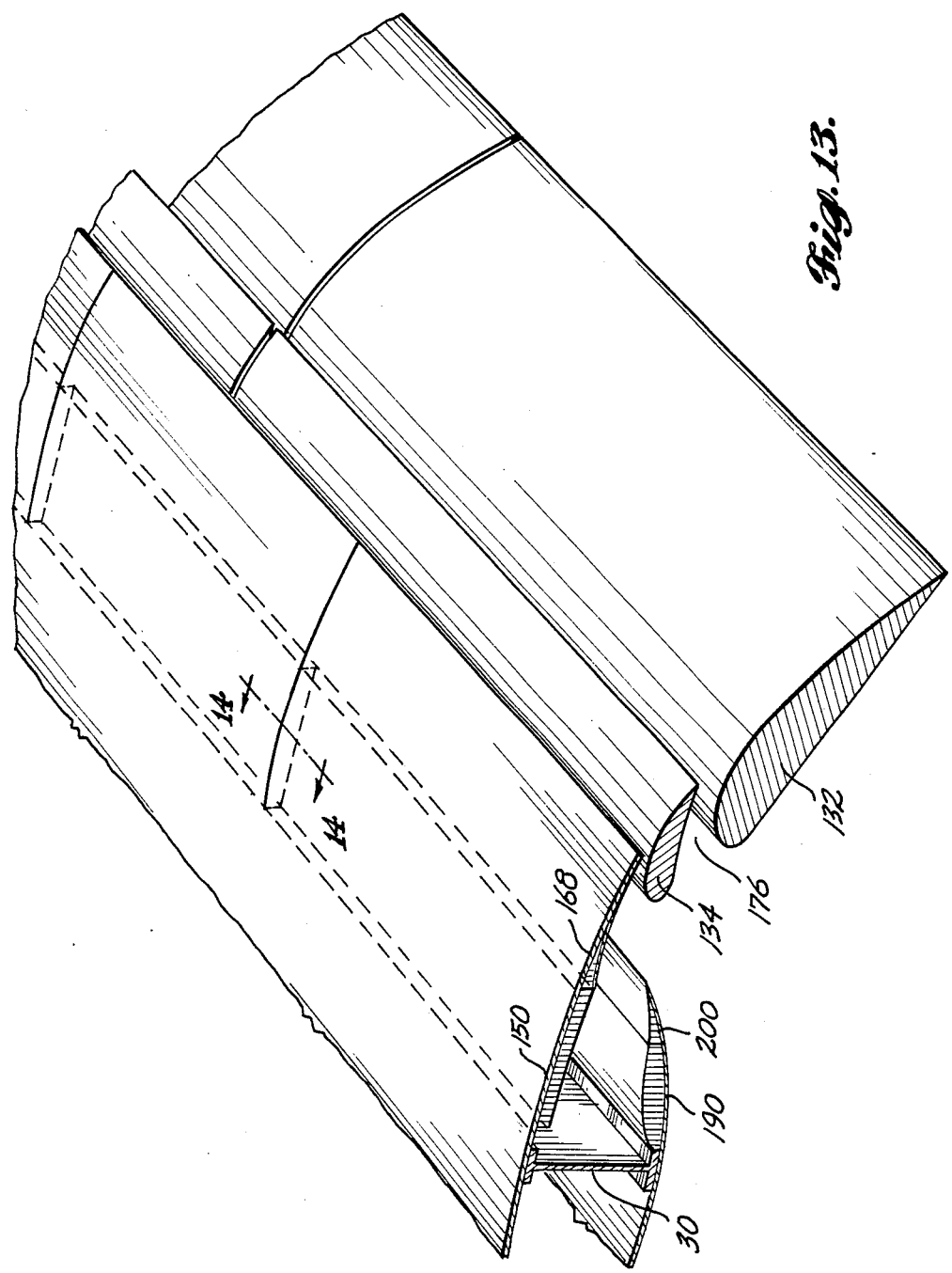
FIG. 13 is a perspective view of the trailing edge region of the wing with the trailing edge flap in a low speed position.

As shown in FIGS. 12 and 13, flexible spoiler section 138 is designed to bend downwardly in a curve 171 so as to maintain a smooth fairing with the flap 128 with the latter in its deployed position. If desired, duct suction can also be applied to the porous upper surfaces of the spoiler during low speed flight as well as during cruise flight in order to minimize flow separation and thereby increase low-speed capability. This is also true of other porous and slotted upper surfaces of the wing disclosed herein. The linkages and actuators for moving the spoiler assembly are or may be of simple and straightforward design using standardized components and therefore require no detailing herein.

With continued reference to FIGS. 12 and 13, the trailing edge fairing 126 comprises a forward bendably flexible portion 172 and a rear portion 174 of rigid form. The flexible portion includes a porous flexible outer skin panel 178 and a nonporous inner plate 180. The forward edge of the outer skin 178 is affixed to the bottom edge 30b of the rear spar 30 and abuts the rear edge of the main box lower skin panel 44. Spaced inwardly from and oriented substantially parallel to the outer skin panel 178 is the inner plate 180. The forward edge of the inner plate is supported through a sliding joint 182 to a support member 184. The member 184 is an inverted version of hanger bracket 158, with the forward portion of member 184 affixed to the bottom edge 30b of rear spar 30. Sliding joint 182 is essentially identical to sliding joint 160 and allows plate 180 to move relative to support member 184 when fairing 126 bends with respect to wing 10. The rear edges of outer skin panel 178 and plate 180 are separated by a lower surface cross member 188. The space between the outer skin panel 178 and the inner plate 180 forms a flexible fairing duct 190.

Contiguous with the rear end of flexible portion 172 is the rigid portion 174 of fairing 126. The rigid portion 174 consists of a porous, rigid outer skin panel 192 and a nonporous, rigid inner panel 194. The forward edges of members 192 and 194 are spaced apart by the lower surface cross member 188 that has apertures 196 that allow air to flow from a rear fairing chamber 200 formed within the rigid portion 174 to the flexible fairing duct 190 formed within the flexible portion 172. The rearmost edges of members 192 and 194 converging together form the trailing edge of fairing 126.

The flexible fairing duct 190 draws boundary layer air through pores in the lower outer skin panel 178 of the flexible portion 172 and through those in outer skin 192 of rigid portion 174, thereby promoting laminar flow over the trailing edge fairing 126.

For low-speed operation with trailing edge flaps extended, the fairing surface 126 is caused to move in concert with the flap through a suitable linkage (not shown) which places it in a faired position as illustrated in FIG. 13. In the low-speed faired position, air flowing over fairing 126 is directed toward slot 176 in trailing edge flap 128.

Figure 14:
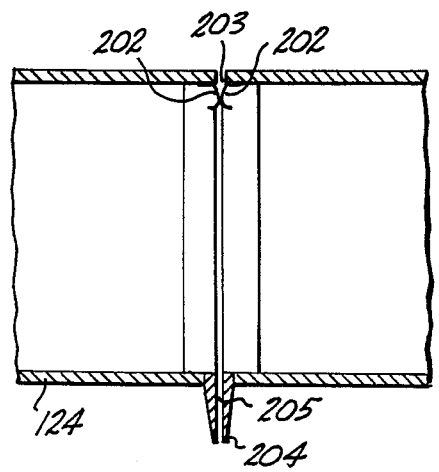
FIG. 14 is a cross-sectional view of the joint between two adjacent spoiler sections taken along section line 14—14 of FIG. 13.

As with the leading edge flaps, the spoilers 124 and fairings 126 are divided into sections extending end to end along the span of the wing. Flexible spoiler duct 150 and flexible fairing duct 190, formed sectionally within the spoiler and fairing sections, respectively, require joint and seals between their adjacent section ends. FIG. 14 illustrates a representative form of seal between the ends of two spoiler sections. In this seal, two flanged flexibly resilient metal or plastic strips 202 bear against each other across the upper joint gap 203 so as to sufficiently eliminate most of the airflow occurring through the gap, a perfect seal not being required. A flapper type seal 204 is used along the lower joint gap 205 to seal the gap. Seal 204 is flexible so that when air is drawn through spoiler duct 150, seals 204 press against one another not permitting any air to pass through gap 205.

In the illustrated suction air collection system 206 (FIG. 15) an air compressor 207 driven by a small gas turbine or electric motor 208 pulls air through all of the leading edge region ducts 70, 120, 100, by way of suction manifolds 209 and 209a. Manifold 209 collects airflow from the spanwise upper surface duct 70 delivering it to the high pressure ratio section of the compressor. Manifold 209a collects airflow from the spanwise lower surface duct 120 and purge duct 100 and delivers it to the low pressure ratio section of the compressor. The trailing edge region ducts 150 and 190 feed airflow into the high pressure ratio and low pressure sections of the compressor respectively. Adjustable control valves near the compressor (not shown) permit flow matching to compressor operating conditions and also allow changes in airflow distribution into the compressor as required by flight conditions and the corresponding suction requirements for each section of the wing. All suction air entering the compressor is discharged into the free stream through exhaust duct 210. If a gas turbine (208) is used to drive the compressor, combustion air for the turbine enters through inlet 212 and the resultant exhaust gases from the turbine exit by way of exhaust duct 214.

Figure 16:
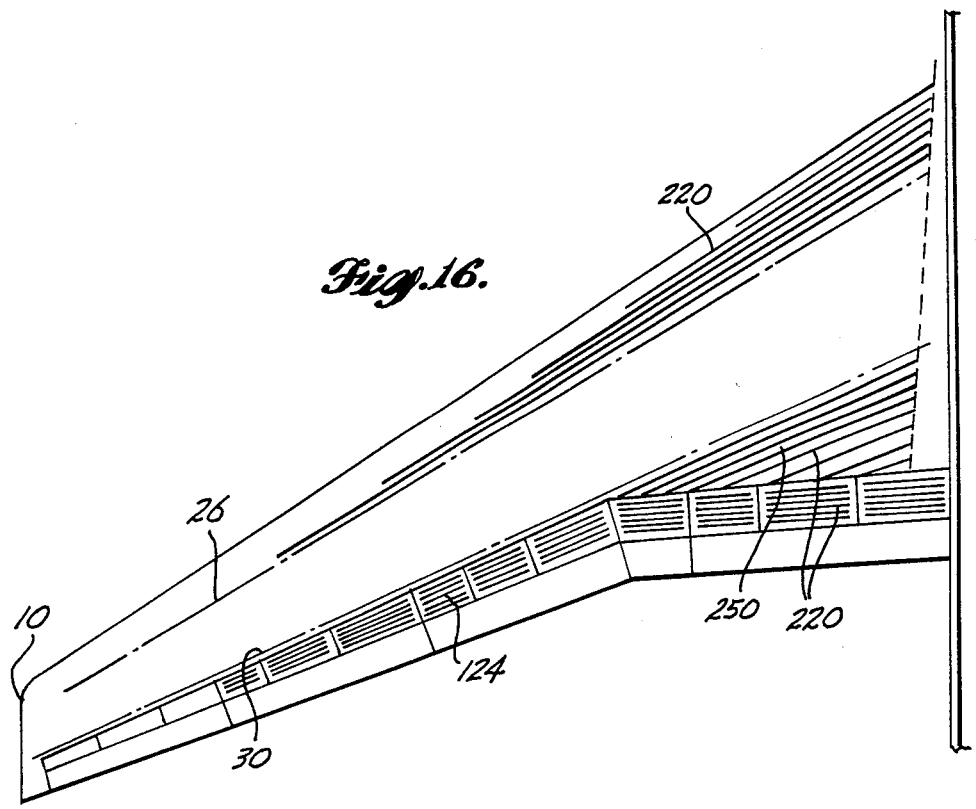
FIG. 16 is a plan view of the upper surface of an aircraft wing incorporating slotted suction surfaces.

In the embodiment of FIG. 16, suction is distributed over the skin surfaces of the leading edge region 18 and trailing edge region 22 by lines of slots 220 rather than by way of porous or multiply apertured skin panels as in the previous embodiment wherein, in addition to slots placed at locations of discontinuities, the major surface panels of these sections are porous or multiply apertured.

Figure 18:
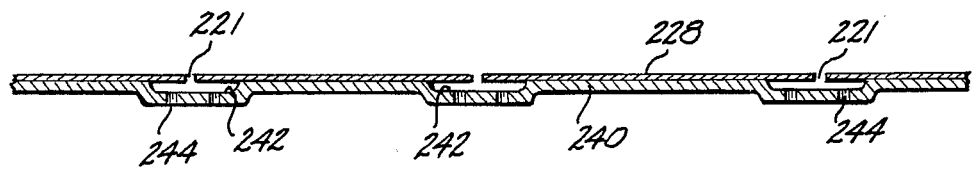
Figure 17:
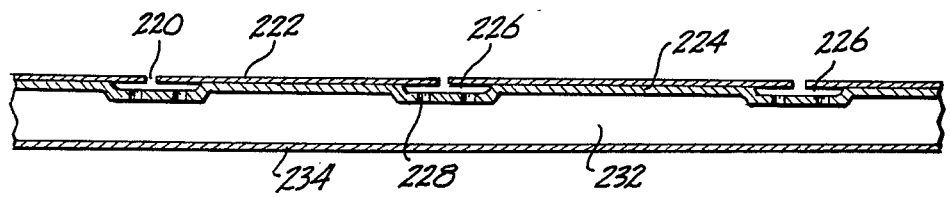
FIG. 17 is a sectional view of a leading edge region suction surface incorporating slots; and, FIG. 18 is a sectional view of a trailing edge suction surface incorporating slots.

The approximately parallel lines of slots 220 extend spanwise of the wing starting adjacent the fuselage and in a nearly parallel relationship. For certain airplane designs and operating conditions, it is desirable to limit the spanwise extent of the suction areas to avoid structural complexity and excess suction airflow. Thus, in FIG. 16 the slots are graduated in length, the shortest being located adjacent the leading edge and the longest spaced aft thereof being located adjacent the front main box spar 26 (see also FIG. 5). For rigid panels, a suitable way to form and apply suction to the array of slots 220 is shown in FIG. 17. The slotted outer skin panel 222 is mounted on and fastened to an underlying support panel 224 with corrugations forming flow distribution channels 226 which are in registry with the respective slots. Air bleed holes 228 in the bases of these channels allow suction air from the channels to enter duct passages 232 formed between the outer skin panel 222 and the inner skin panel 234. For flexible panels, a modified LFC slot system may be applied in a similar manner to the trailing edge section surfaces. FIG. 18 depicts this. It includes slots 221 in the outer surface panel 228, a support panel 240 with corrugations providing flow channels 242 with bleed holes 244, and an arrangement wherein those holes lead into the associated main suction duct (not shown).

Referring again to FIG. 16, a triangularly shaped area 250 on the inboard upper surface of wing 10 is located rearward of rear span 30. For a wing having a planform such as that illustrated in FIG. 16, the surface of area 250 would be a suction surface. If a porous skin is used, a construction similar to that illustrated in FIG. 6 would be employed. If suction slots are used as shown in FIG. 16, a skin configuration similar to that illustrated in FIG. 17 would be used. Air drawn through the surface of area 250 is passed into spoiler duct 150.

Although the illustrations used here apply generally to an airplane wing, the fundamental teachings can be adapted equally well to other wing-like surfaces of an airplane such as in the empenage including those areas which incorporate control surfaces.

Having described the invention in its preferred embodiment, it is to be realized that changes and modifications therein may be made without departing from the essential concepts representing the advancements in this art. It is therefore intended that the scope of the claims that follow be limited by their definitional terms and equivalents thereof.

The embodiments of the invention in which an exclusive property or privilege is claimed are defined as follows:

1. A laminar flow control airfoil having a leading edge and a trailing edge, comprising:
    a leading edge region including the leading edge of said airfoil;
    the leading edge flap means for providing additional lift for said airfoil during low-speed operation of said airfoil and for protecting said leading edge region from insect accumulation and surface erosion caused by dirt and rain during said low-speed operation, said leading edge flap means being movable between a low-speed position and a cruise position;
    first suction means associated with said leading edge region for removing boundary layer air flowing over upper and lower surfaces of said leading edge region, said first suction means comprising:
    a porous upper skin on said leading edge region;
    an upper surface duct connected to said porous upper skin for drawing off boundary layer air flowing over said porous upper skin;
    a leading edge flap purge duct for providing suction of boundary layer air from said leading edge flap means when said leading edge flap means is in said cruise position;
    a porous lower skin on said leading edge region; and,
    a lower surface duct connected to said porous lower skin for drawing off boundary layer air flowing over said porous lower skin;
    a main box region contiguous to said leading edge region for receiving air flowing over said leading edge region, said main box region including an upper and a lower surface configured for providing a favorable pressure gradient without the application of suction for air flowing in a rearward, chordwise direction over said main box region;
    a trailing edge region contiguous to said main box region on the end thereof remote from said leading edge region, said trailing edge region including said trailing edge of said airfoil; and
    second suction means for removing boundary layer air flowing over upper and lower surfaces of said trailing edge region of said airfoil.

2. The laminar flow control airfoil of claim 1, wherein said second suction means comprises:
    a porous upper skin on said trailing edge region;
    an upper duct connected to said porous upper skin for drawing off boundary layer air flowing over said porous upper skin;
    a porous lower skin on said trailing edge region; and,
    a lower duct connected to said porous lower skin for drawing off boundary layer air flowing over said porous lower skin.

3. The laminar flow control airfoil of claim 2, wherein said leading edge flap means comprises:
    a leading edge flap having a front edge and a rear edge swingably attached to said leading edge region of said airfoil for movement between a retracted or cruise position and an extended or low speed position, said leading edge flap forming a portion of a lower surface of said leading edge region when said flap is stored in said cruise position in said leading edge region, said leading edge flap being swingable forwardly through an arcuate path to said low-speed position forward of said airfoil, said leading edge flap sized to form a leading edge front slot between said rear edge of said flap and said leading edge region when said leading edge flap is in said cruise position;
    a front stop plate attached to said leading edge region against which said front edge of said leading edge flap abuts when said leading edge flap is in said cruise position, said front stop plate configured to cooperate with said leading edge flap purge duct to form passage means for connecting said front slot to said leading edge flap purge duct; and
    a rear flap stop attached to said leading edge region against which said rear edge of said leading edge flap abuts when said leading edge flap is in said cruise position, said rear flap stop configured to cooperate with said leading edge flap to form passage means for connecting said rear slot to said leading edge flap purge duct.

4. The laminar boundary layer flow airfoil of claim 3, wherein said trailing edge region includes:
    a trailing edge spoiler having a flexible section and a rigid section, said rigid section being contiguous with and located rearward from said flexible section, said spoiler being movable between a cruise position wherein the upper surface of said spoiler has a first upward convex curvature and a low speed position wherein said rigid section has moved downwardly through an arcuate path with the upper surface of said spoiler forming a second upward convex curvature, said second convex curvature having a shorter radius of curvature than said first convex curvature; and
    a trailing edge fairing having a flexible portion and a rigid portion, said rigid portion being contiguous with and located rearward from said flexible portion, said fairing being movable between a cruise position and a low speed position.

5. A jet aircraft laminar flow control airfoil having leading and trailing edge regions and an intermediate main box region joined thereto and contoured complementally thereto so as to form an efficient composite airfoil, said leading and trailing edge regions each having upper and lower skin surface panels that are porous, said leading edge region including a leading edge flap deployable during low-speed flight from a stored cruise position to extend at a downward and forward incline at a position forward of the leading edge of the airfoil, thereby to deflect dirt and insects over the airfoil while augmenting wing lift, said leading edge region including suction slots that are formed adjacent leading and trailing edges of said leading edge flap when said flap is in its stored cruise position, said airfoil including means internal thereto for applying suction to said skin surface panels for removing boundary layer air flowing over said skin surface panels at flight speeds including cruise speed, thereby to maintain laminar flow over said skin surface panels by offsetting the natural tendency toward turbulent flow along said skin surface panels at such speeds, said main box region having top and bottom airfoil surfaces comprising the major surface area of the airfoil and being contoured to maintain favorable pressure gradients along the same that produce laminar flow inherently and substantially without aid of suction applied through the surfaces thereto to remove boundary layer air.

* * * * *

UNITED STATES PATENT AND TRADEMARK OFFICE
CERTIFICATE OF CORRECTION

PATENT NO. : 4,575,030
DATED : March 11, 1986
INVENTOR(S) : Louis B. Gratzer

It is certified that error appears in the above-identified patent and that said Letters Patent is hereby corrected as shown below:

Column 9, line 49, delete "and" after "joint"

Signed and Sealed this

Twelfth Day of August 1986

[SEAL]

Attest:

Attesting Officer

DONALD J. QUIGG

Commissioner of Patents and Trademarks